United States Patent
Mallo et al.

(10) Patent No.: US 7,302,406 B2
(45) Date of Patent: Nov. 27, 2007

(54) METHOD, APPARATUS AND SYSTEM FOR RETRIEVAL OF SPECIALIZED CONSUMER INFORMATION

(75) Inventors: Mike Mallo, Austin, TX (US); Jana Mallo, Austin, TX (US); David Kumhyr, Austin, TX (US)

(73) Assignee: Internation Business Machines Corporation, Armonk, NY (US)

( * ) Notice: Subject to any disclaimer, the term of this patent is extended or adjusted under 35 U.S.C. 154(b) by 582 days.

(21) Appl. No.: 10/870,226

(22) Filed: Jun. 17, 2004

(65) Prior Publication Data

US 2005/0283405 A1    Dec. 22, 2005

(51) Int. Cl.
 *G06Q 30/00* (2006.01)
(52) U.S. Cl. .............................. 705/26; 705/1; 705/10; 705/14; 705/37; 707/5; 709/223; 709/224; 709/228
(58) Field of Classification Search .................... 705/1, 705/10, 14, 26, 37; 707/5; 709/223, 224, 709/228
See application file for complete search history.

(56) References Cited

U.S. PATENT DOCUMENTS 5,854,923 A * 12/1998 Dockter et al. .............. 707/5

2002/0052825 A1 * 5/2002 Bensemana .................. 705/37
2004/0093257 A1 * 5/2004 Rogers et al. ................ 705/10
2006/0136589 A1 * 6/2006 Konig et al. ................ 709/224

FOREIGN PATENT DOCUMENTS

WO    2004-418777    * 5/2004

OTHER PUBLICATIONS

Krebs, Michelle, "Comparing Quality Ratings"; New York times. (Late edition (East Coast)). New York, N.Y.: May 21, 1999, p. F.1 extracted fro Proquest database online on Jun. 19, 2007.*

* cited by examiner

*Primary Examiner*—Yogesh C. Garg
(74) *Attorney, Agent, or Firm*—Jeff LaBaw; Darcell Walker (57) ABSTRACT

The system of the present invention is a method and system that enables consumers to receive specialized product and company information on demand to aid in consumer purchases. The system of this invention can comprise a physical interface device, a consumer profile, a products and services interface, and a consumer database. Each user in the system has an individual profile the consumer can set to identify their preferences in regard to a particular product. When the consumer sends a query about a particular product, the method of the invention performs a comparison of the consumer preferences a product with objectives ratings for that product. The consumer receives a result of these comparisons with an indication of whether the product matches the preferences indicated by the consumer. A match suggests that the product is one the consumer would purchase.

19 Claims, 8 Drawing Sheets

Consumer Profile No. 12345

| Product Characteristic | Characteristic Rating |
|---|---|
| Made in your country | 1 |
| Product Quality | 4 |
| High recycled index | 3 |
| Low corporate lawsuits | 2 |

FIG. 5

Product Survey

| Product Attribute | Product No. 1122 | | | |
|---|---|---|---|---|
| Quality | 1 | 2 | 3 | 4 |
| Size | 1 | 2 | 4 | 4 |
| Availability | 1 | 2 | 3 | 4 |
| Price | 1 | 2 | 3 | 4 |

FIG. 6

Product Summary

| Product Attribute | Quality | Size | Price | Availability | Company/Brand |
|---|---|---|---|---|---|
| Quality | 3 | 2 | 4 | 1 | Crest |
| Size | 2 | 4 | 2 | 3 | Colgate |
| Availability | 2 | 3 | 4 | 3 | Scope |
| Price | 4 | 2 | 3 | 3 | Shell |

FIG. 7

Company Survey

| Company Characteristic | Company No. 1133 | | | |
|---|---|---|---|---|
| Low corporate lawsuits | 1 | 2 | 3 | 4 |
| Products made in home country | 1 | 2 | 3 | 4 |
| Union shop | 1 | 2 | 3 | 4 |
| Employee satisfaction | 1 | 2 | 3 | 4 |

FIG. 8

Company Summary

| Product Attribute | Lawsuits | Home Country | Product Quality | Recycle Index |
|---|---|---|---|---|
| Company A | 4 | 4 | 4 | 2 |
| Company B | 1 | 4 | 2 | 2 |
| Company C | 2 | 1 | 4 | 2 |
| Company D | 3 | 1 | 3 | 2 |

METHOD, APPARATUS AND SYSTEM FOR RETRIEVAL OF SPECIALIZED CONSUMER INFORMATION

FIELD OF THE INVENTION

The present invention relates to a method and system for determining whether or not to purchase a particular product and in particular to a method and system that stores information related to a consumer's preferences with regard to the purchase of a product, features of the product. This invention also relates to the retrieval of such consumer and product information and the performance of product analysis using the retrieved consumer preference information and product information in order to give a recommendation to the consumer concerning the purchase of that particular product.

BACKGROUND OF THE INVENTION

Consumption is the lifeblood of the major economies of the world. Consumption requires the acquisition of the products and services. These acquisitions occur between consumers and merchants (entities that own the desired goods and services) through transactions in which there is an exchange of a medium (usually currency) from the buyer to the merchant for commodities valuable to the merchant. The transaction is known as a sale. In a typical sale, the merchant displays their items for sale. This display contains the purchase price for which a merchant will sell (transfer) the item to the prospective buyer.

Today's consumer has many choices in almost every product and service that they purchase. The average consumer makes many daily decisions on technology, entertainment, travel, transportation, telecommunications, personal care products, financial services, foods and beverages. Consumers want to make sure that they are making good purchases according to their own preferences in the areas of quality and value. Also some consumers like to vote with their dollars by supporting goods and services that conform to personalized ideals that may include employee demographics, treatment of employees, environmental friendliness, and good corporate citizenship in the eyes of the law. However, the vast number of companies and products available makes this research for every purchase unmanageable.

One alternative solution that exists is brand recognition. Consumers put their faith in brand names have served them well in the past. The problem with this solution is as companies merge, brands expand their product line and the qualities associated with a brand may not apply across the entire product or service.

A second alternative solution is the creation of materials that are designed to assist the consumer in learning more about particular products and services. One major consumer assistance mechanism comprises print media such as magazines and newspapers that address consumer issues. A problem with this solution is it is manual process that does not make the information available on demand for each purchase. These publications have articles that comment on the quality of certain products. Many of these publications have critics that review various products and rate these products based on a set of established criteria. In addition, to the printed publications, some agencies actually perform tests on the quality of certain products. The automobile industry is an example of an area where agencies perform various tests on the products. These tests include reliability tests and safety tests. These agencies then publish the results of these tests to inform the public about these tested products. Furthermore, consumer 'watchdog' groups also evaluate various products in order to assure that these products perform as advertised.

A problem with these solutions is that they are manual processes that do not make the information available on demand for each purchase. Currently, the consumer has to read the information and remember or note various evaluations of various products in which the consumer has interest. In addition, the information in many of these resources is general to the public which requires the consumer to interpret these results in view of the individual's own personal preferences.

There remains a need for a method and system that can provide a consumer with immediate information on a particular product of interest and in accordance with the personal preferences of the requesting consumer. This invention is for a mechanism to make this possible.

SUMMARY OF THE INVENTION

It is an objective of the present invention to provide a method and system that will enable to consumer to receive immediate information about a particular product.

It is a second objective of the present invention to provide a method and system that will evaluate a product based on the preferences of a requesting consumer and provide a product purchasing recommendation to that consumer.

It is a third objective of the present invention to provide a consumer database containing information about the purchasing preferences of a consumer.

It is a fourth objective of the present invention to provide a system that enables a consumer to obtain an evaluation of a product from a remote location for the purpose of making a purchasing decision with regard to that product.

The system of the present invention is a method and system that enables consumers to receive specialized product and company information on demand to aid in consumer purchases. The system of this invention can comprise a physical handheld machine, web page front end, and database backend component. The components in an embodiment of the present invention can comprise a consumer profile. This profile could exist on a web page. Each user of the system has an individual profile they can set to identify their choices in consumer purchases. The consumer can set individual purchasing attributes, or subscribe to other people's profiles including possible celebrity profiles like consumer's union, Ralph Nater, or others. Another component in the present invention is a location that contains information about various products and services. This location can also be a web page located on or connected to a communication network. Each user (consumer) of the present invention can apply their individual profile to any good or service in the database to get a detailed report of the advantages and disadvantages of purchasing a product based on their profile. In another embodiment, the consumer could get a simpler decision that would be a display list of all available products and companies in the database. Each product would have a simple red, yellow, green categorization that indicates the system's recommendation with regard to purchasing that product. A red light would indicate a do not purchase recommendation. A green light could indicate a purchase recommendation. The yellow light could indicate a purchase caution.

A third component of the system of the present invention can be a physical handheld machine used by the consumer.

This handheld device would be used in the embodiment in which a consumer is on location at a store and desires to retrieve information and a purchasing recommendation about a particular product. In this embodiment, each consumer can use a pervasive type machine to carry with them to the grocery store, gas station, shopping mall, etc to scan UPC codes or RFIDs of products. The handheld machine can communication with the database in real time to return a simple red, yellow, green categorization based on their saved profile. The fourth component is a consumer database. This database is used by the web page and the handheld machine to store and retrieve information in many decision made by the consumer in many dimensions. Examples of dimensions it is storing are users, products, services and companies. The database will relate the companies to their products.

A scenario is a consumer making a purchase decision at a convenience store for toothpaste. In this store, there are two toothpaste brand's available, Crest and Colgate. Using available solutions, the consumer would rely in a brand name or on remembering product information from a magazine, article or other advertisement. This information would not be the most recent, and most consumers do not remember the details of all the product ratings they may have read. With the present invention, the consumer can use their handheld machine to scan the UPC codes of each product available and receive a near instant feedback now the scanned products fit their consumer profile.

The origination of the data feeding the database is from two sources. A core team that searches public records, magazines, and articles will enter publicly obtained information. The second source is from current user's experiences with product's quality and subjective information they are inclined to enter. Users will receive ratings based on feedback mechanisms from other user's to increase the reliability of the data.

DETAILED DESCRIPTION OF THE INVENTION

Figure 1:
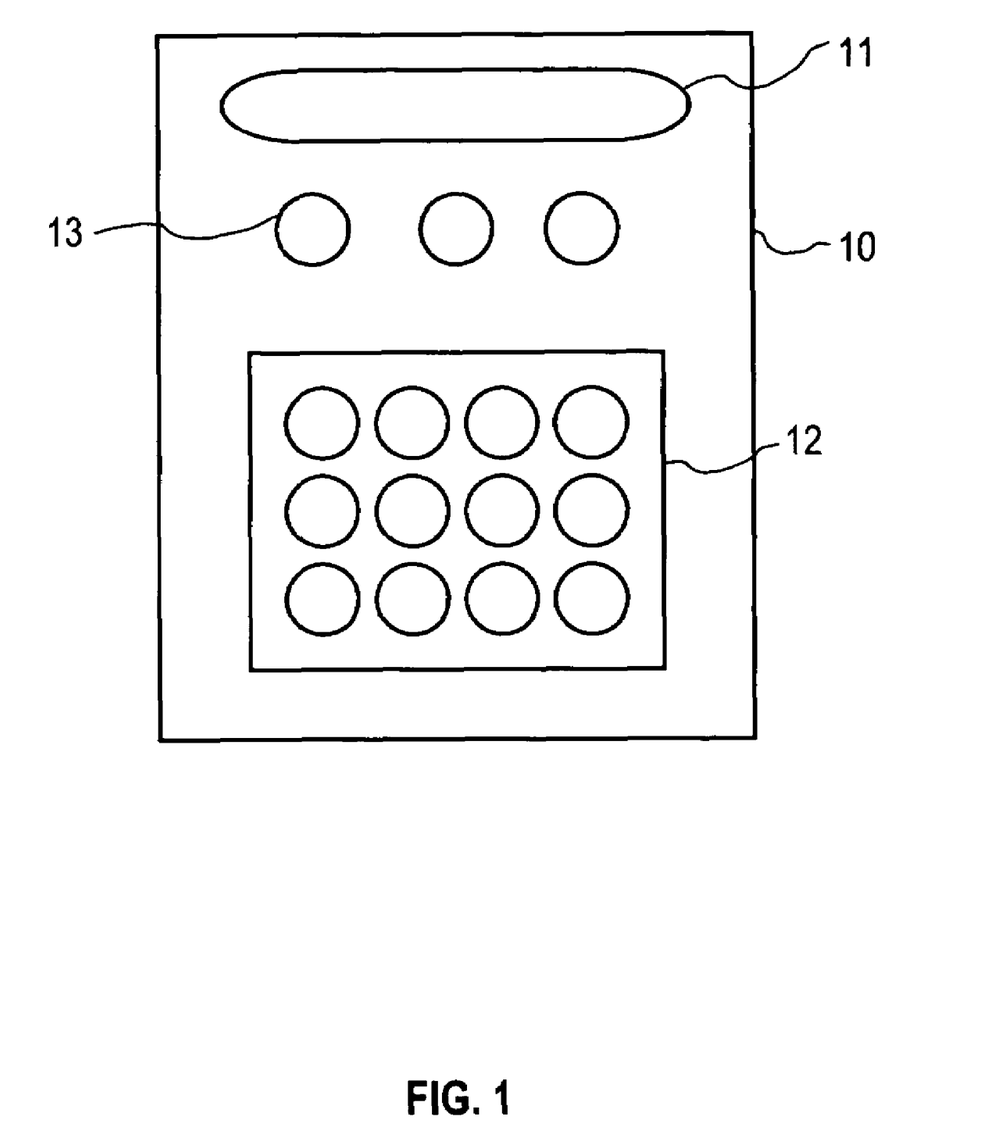
FIG. 1 is an illustration of a personal digital assistant device that can be used in the implementation of the present invention.

One embodiment of the system of the present invention comprises a wireless handset or personal digital assistant (PDA). The store can provide these PDA headsets. The customer uses this device to scan the product and retrieve information concerning the product. FIG. 1 shows a PDA 10 device that can be used in the implementation of the present invention. This device can contain scanning mechanism 11 to scan product prices when the customer is in a store. The PDA can also have the ability to connect to a communication network in order to transmit product information to the consumer database and receive information from the consumer database. A keypad 12 can display certain information received at the PDA. In addition, the PDA can have a series of LEDs 13 can illuminate to indicate the purchase recommendations to the consumer concerning the purchase of products.

Figure 2:
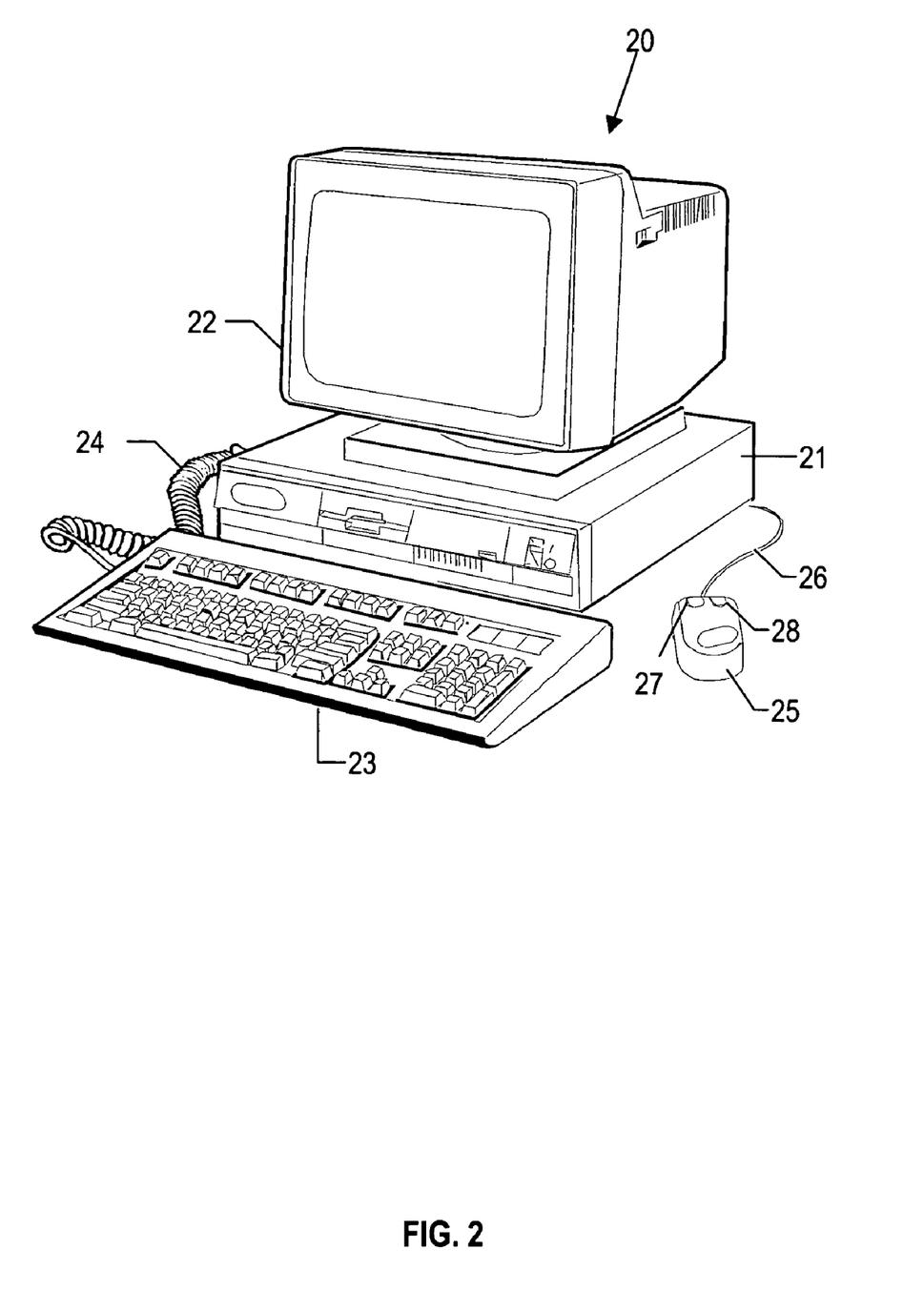
FIG. 2 is an illustration of a conventional computing device used for communication between a consumer and the consumer database in the implementation of an embodiment the present invention.

With reference now to FIG. 2, there is depicted a pictorial representation of data processing system 20 which may be used in implementation of the present invention. The data processing system can be implemented when the consumer is at home or some other stationary location. As with the PDA of FIG. 1, the consumer can access a consumer database via a communication network connected to the data processing system 20. As may be seen, data processing system 20 includes processor 21 that preferably includes a graphics processor, memory device and central processor (not shown). Coupled to processor 21 is video display 22 which may be implemented utilizing either a color or monochromatic monitor, in a manner well known in the art. Also coupled to processor 21 is keyboard 23. Keyboard 23 preferably comprises a standard computer keyboard, which is coupled to the processor by means of cable 24. Also coupled to processor 21 is a graphical pointing device, such as mouse 25. Mouse 25 is coupled to processor 21, in a manner well known in the art, via cable 26. As is shown, mouse 25 may include left button 27, and right button 28, each of which may be depressed, or "clicked", to provide command and control signals to data processing system 20. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system may be implemented utilizing a personal computer.

Figure 3:
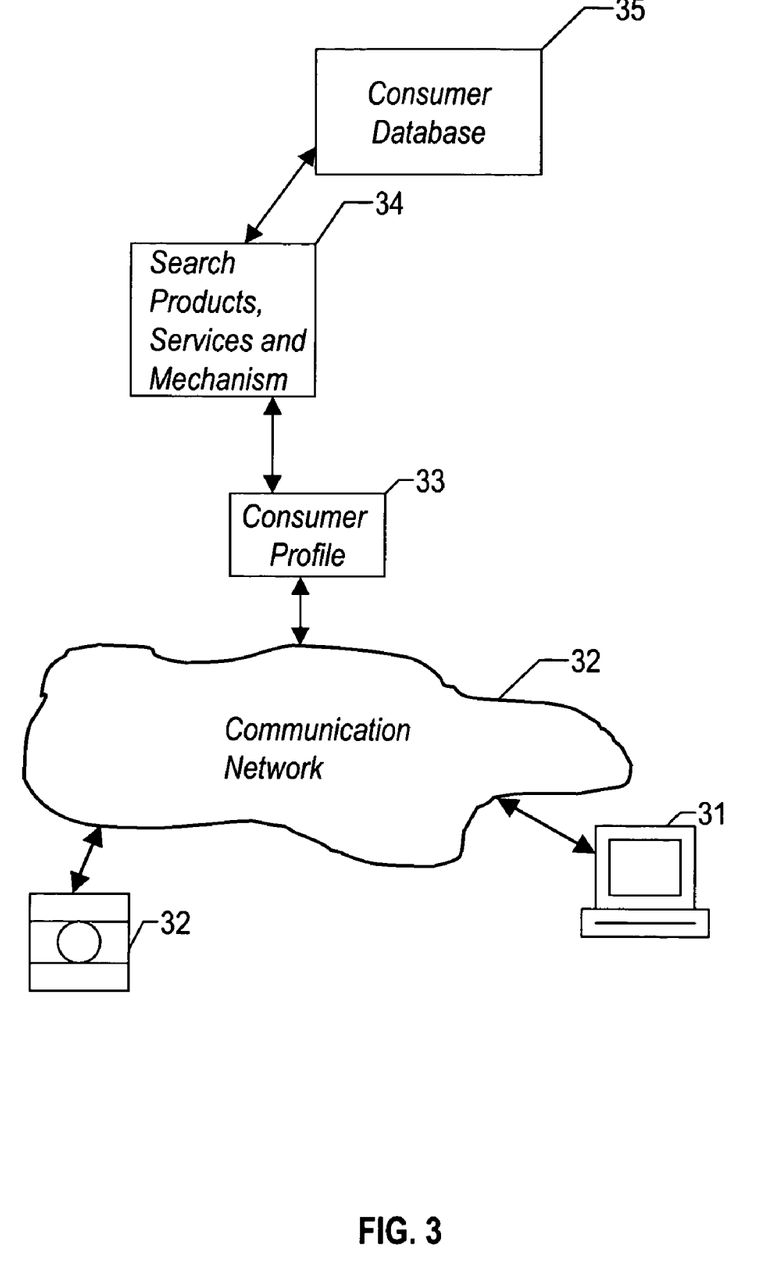
FIG. 3 is a general configuration of the system for implementation of the present invention.

FIG. 3 is a basic configuration of the system for implementation of the present invention. As shown, the system comprises an interface device that enables the consumer to access consumer information in the system. As mentioned, this interface device can be PDA 30 that the consumer uses when in a remote location such as a store. In accordance with the present invention, this PDA or mobile device will have: 1) A barcode scanner to automatically read UPC codes from products if available; 2) A small keypad to manually enter the products and services without bar codes like gas stations, restaurants, auto dealers, etc; 3) A wireless Ethernet connection to the Internet or a wireless cellular connection to the internet; and 4) An LCD screen showing the results of the product entered based on their profiles.

The present invention can also have a conventional terminal interface device 31 that connects the consumer to the information in the system. The conventional terminal interface device is useful when a consumer is in a stationary location such as a home and is performing research of various products. Unlike the PDA 30, the conventional terminal is stationary. As a result, the standard equipment and features of the conventional terminal are sufficient for operating in the system of the present invention.

Both types of interface devices are connected to a communication network environment such as the Internet 32. The network may include distributed data processing systems and a plurality of networks, such as Local Area Networks (LAN), which includes a plurality of individual interface devices. The communication network 32 facilitates the access of consumer information by the individual consumer.

The consumer profile 33 contains specific information about the buying preferences of an individual consumer. The consumer profile web page is customized to enter individual characteristics they desire about products or the companies that produce the products. Weightings are added to each characteristic so that the end result of red, yellow, or green can be calculated when running the queries. Users can inherit other user's profiles if they wish. Some characteristics that the consumer can include in their profile are:

Company Centric Dimensions:

Number of employees—% size vs. other companies in industry

Employee demographics—% female, % US based, etc. vs. other in industry

Employee satisfaction—% employees returning favorable feedback

Employee Union participation—% union based employees

Number of lawsuits—% of open lawsuits vs. other companies in industry

Number of EPA violations—% of violations vs. other companies in industry

Product or Service Centric Dimensions:

Product Recycled index—% of products made from recyclable goods

FDA recall—y/n

Contains allergic ingredients—customizable

Consumer reports rating—Excellent, Good, Fair, Bad, Poor

Healthiness of ingredients—% fat, # of calories, sugar content, etc.

Service ratings—% satisfied customers

Value compared to other services—% value

Restaurant health inspections—% rating compared to other restaurants

The consumer profile can reside in a database, displayable on a web page that is unique for that consumer. This web page can reside in a machine that contains a large number of similar consumer profiles. In the alternative, the consumer web page can reside in a remote location with links to the consumer and the other components in the system of the present invention.

The search products and services center 34 contains a routine capable of performing a detailed comparison of all products in the consumer database 35. The search products and services mechanism can reside on a web page or on other devices or systems. In addition to performing product comparisons, the search products and services mechanism 34 provides the consumer with the ability to print a 'cheat sheet' that the consumer can carry with them when making consumer decisions. With this search products and services mechanism, the consumer can also sign up for alerts should any of their chosen products or companies position change so they can re-evaluate their decisions.

The consumer database 35 contains information about various products and services. As previously mentioned, this information can include product and manufacturer information. The information can also contain company history data, employee demographic information and any other type of information that could be of interest to a consumer. It is very likely that the information for any particular product will depend on the available sources of information for that product. The components of the consumer database include: 1) A central database schema holding the dimensions and relationships of products to companies as well as the data; and 2) Data marts will hold the results of the query logic that evaluates the product decision against the weighted characteristics of the product and company that makes that product and stored by user's profiles for quick access to the queries.

Figure 4:
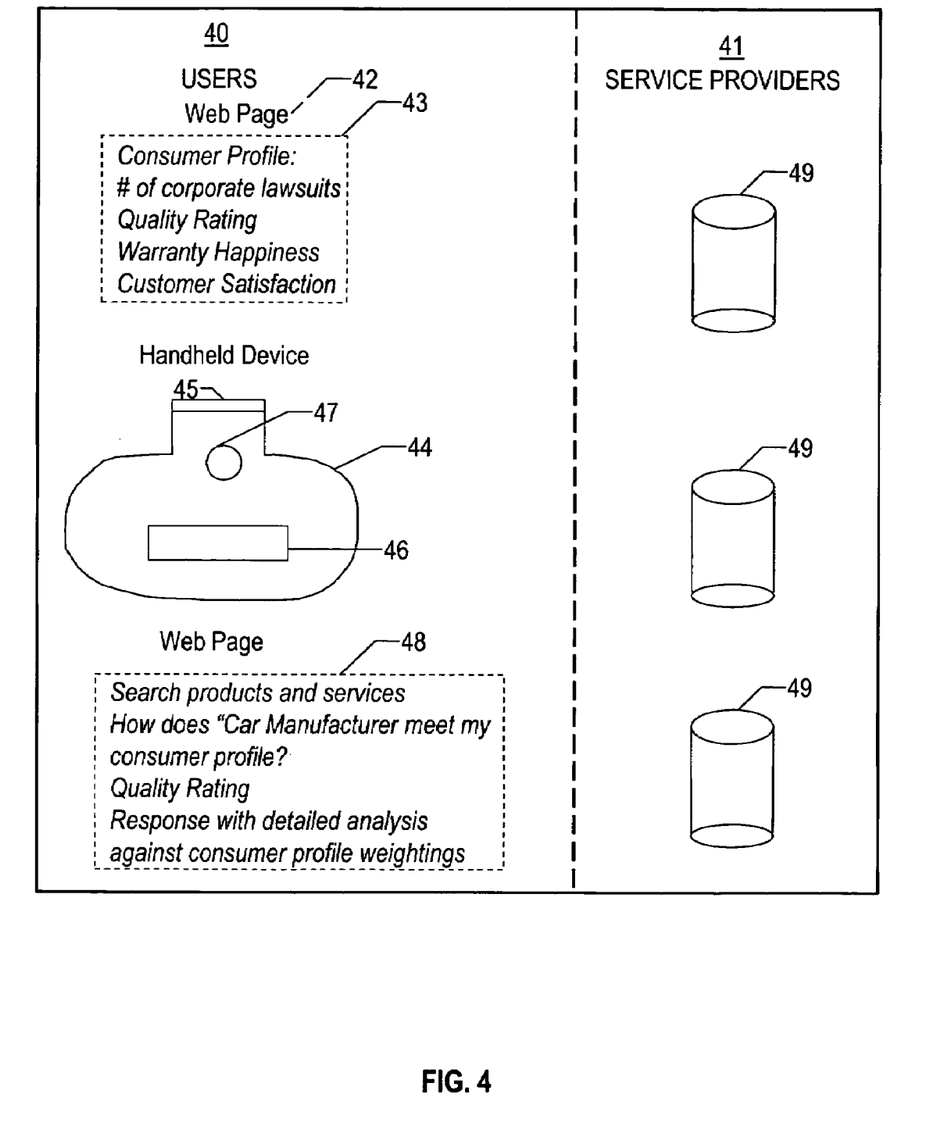
FIG. 4 is an example of a configuration of the system of the present invention.

FIG. 4 is one example of a configuration of the system of the present invention. In this configuration, there is a users' side and a service providers' side. The users' side 40 comprises the application mechanisms for implementation of the present invention. The service providers' side 41. On the users' side is the web page 42 containing a consumer profile 43. As shown, this profile would contain information that is important to that consumer when that consumer considers making a purchase of that product or service. This information can include: the number of corporate lawsuits, a quality rating, warranty information and information about customer satisfaction. The users' side also has the consumer's interface device 44. As shown, this device could be a handheld device with a scanning mechanism 45 for scanning bar code information. The device can also have a keypad 46 to enter data and a series of lights 47 that are used to indicate a purchasing recommendation. The users' side also has a web page 48 for the search products and services routines. This web page can contain the objective information about a particular product or service and the routines used to perform product evaluations. The service provider side 41 is location for the server devices 49 that can contain the components of the present invention. Referring to FIG. 3, the web components indicated in FIG. 4 can reside in one server device.

Figure 5:
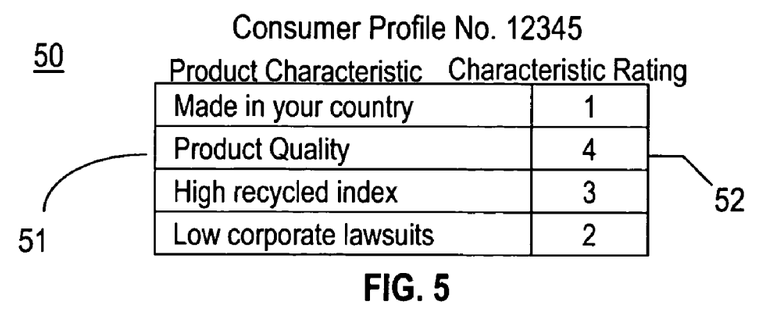
FIG. 5 is an illustration of products in a consumer profile in accordance with the present invention.

FIG. 5 is an illustration of products in a consumer profile in accordance with the present invention. Each consumer has a number that identifies that consumer and their corresponding information. In this illustration, the consumer number is 12345. An individual consumer will have a single consumer profile 50 that contains purchasing characteristics that are important to that consumer. The profile can be a table as shown in FIG. 5. This table can have a plurality of records with each record having two fields. One field 51 is the "Product Characteristic" field having characteristics such as "product quality". The second field 52 is the rating the consumer has given that characteristic. In this illustration, the ratings range can be 4—very important, 3—important, 2—somewhat important and 1—not important. The rating corresponds to the weight that characteristic will be have during a product evaluation.

Figure 6:
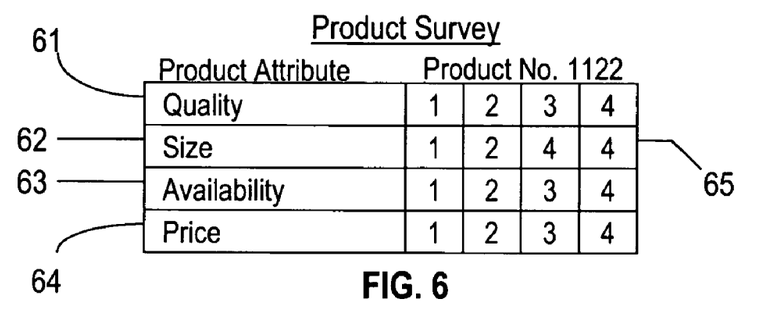
FIG. 6 is an illustration of a product survey used by a consumer to indicate specific preferences of that consumer with regard to a particular product.

FIG. 6 is an illustration of a product survey used by a consumer to indicate specific experiences of that consumer with regard to a particular product. When a consumer wishes to enter their experiences in regard to a particular product, via the product survey (FIG. 6), this information will be incorporated into the general consumer database along with other consumer's experiences for that product. Each product will have a unique product number that identifies that product. As shown in FIG. 6, the survey could consist of a table with various product attributes. The consumer enters a rating for the various product attributes such as, product quality 61, product package size 62, product availability 63 and product price 64. The survey will have ratings 65 for each product. This list of product attributes is only an example of the types of attributes that could be included in a product survey. The survey could contain many more attributes that are relevant to a consumer's purchasing decisions. The consumer can select one of the indicated rating that is the closest match to the consumer's experience with regard to that product. In this illustration, the ratings can be 4 very satisfied, 3 satisfied, 2 not satisfied, and 1 poor. In an example, for the product that is a particular brand of toothpaste (no, 1122), quality may be perceived to be high with this consumer's experience. As a result, the consumer would select 4 in the survey.

Figure 7:
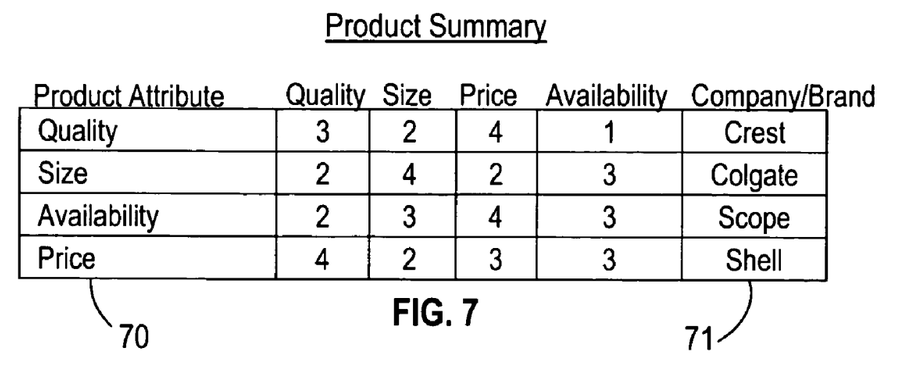
FIG. 7 is an illustration of the product summary contained in a consumer database.

FIG. 7 is an illustration of the product summary contained in a consumer database. The consumer database can contain products and product summaries of specific brands within that product. As shown in FIG. 7, the Product Summary comprises a table with the combined product survey results from all the consumers who filled out a product survey for a specific product. This rating process can be similar to current processes that give a product a grade based some consumer research and analysis of that product. The ratings may be as a result of a comparison between that product and competing products. The product summary shown in FIG. 7 has a field 70 for the product type and a field 71 for the product brand. Each product would receive a rating for various attributes of that product. In an example, if the product were 'Crest toothpaste', it would receive objective consumer ratings for each attribute listed in the product summary. The product attributes shown in FIGS. 6 and 7 are illustrative of the typical kinds of things that are of concern to a consumer. The particular group of attributes for a product survey or product summary can vary. However, it is important that the attributes for both the product survey and product summary be the same.

Figure 8:
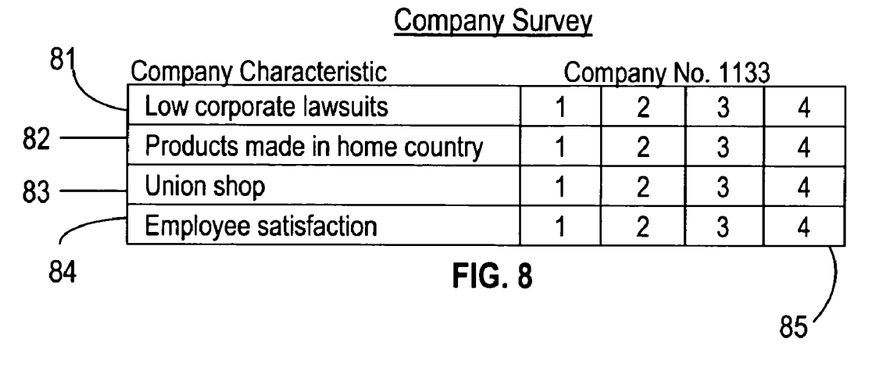
FIG. 8 is an illustration of a company survey contained in a consumer database in accordance with the present invention.

FIG. 8 is an illustration of a company survey used by a consumer to indicate specific experiences of that consumer with regard to a particular company. This survey is similar to the product survey of FIG. 6. When a consumer wishes to enter their experiences in regard to a particular company, via the company survey (FIG. 8), this information will be incorporated into the general consumer database along with other consumer's experiences with that company. Each company will have a unique company number that identifies that product. As shown in FIG. 8, the survey could consist of a table with various company attributes overall quality 81, corporate lawsuits 82, company size 83, percentage of parts made in home country 84. The survey will have ratings 85 for each company. This list of company attributes is only an example of the types of attributes that could be included in a company survey. The survey could contain many more attributes that are relevant to a consumer's purchasing decisions. The consumer can select one the indicated ratings that is the closest match to the consumer's experience with regard to that company. In this illustration, the ratings can be 4 very satisfied, 3 satisfied, 2 not satisfied, and 1 not applicable. In an example, for Company A (no, 1133), percentage of parts made in home country may be perceived to be high with this consumer's experience as they have done the appropriate research to confirm this. As a result, the consumer would select 4 in the survey.

Figure 9:
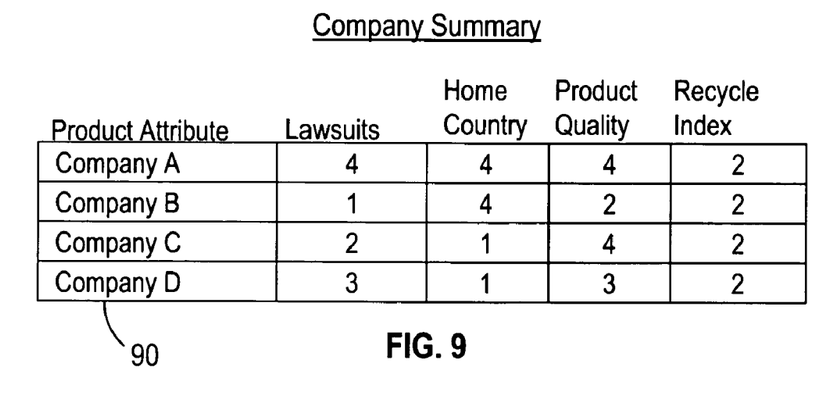
FIG. 9 is an illustration of a company summary contained in a consumer database in accordance with the present invention.

FIG. 9 is an illustration of the company summary contained in a consumer database. This summary is similar to the product summary of FIG. 7. The consumer database can contain company summaries of specific companies. As shown in Figure B, the Company Summary comprises a table with the combined company survey results for a specific company from all the consumers who filled out a company survey. This rating process can be similar to current processes that give a company a grade based some consumer research and analysis of that product. The ratings may be as a result of a comparison between that company and competing companies. The company summary shown in FIG. 9 has a field 90 for the company name. Each company would receive a rating for various aspects of that company. In an example, if the company was 'Company A', it would receive objective consumer ratings for each attribute listed in the company summary. The company attributes shown in FIGS. 8 and 9 are illustrative of the typical kinds of things that are of concern to a consumer. The particular group of attributes for a company survey of summary can vary. However, it is important that the attributes for both the company survey and company summary be the same.

Figure 10:
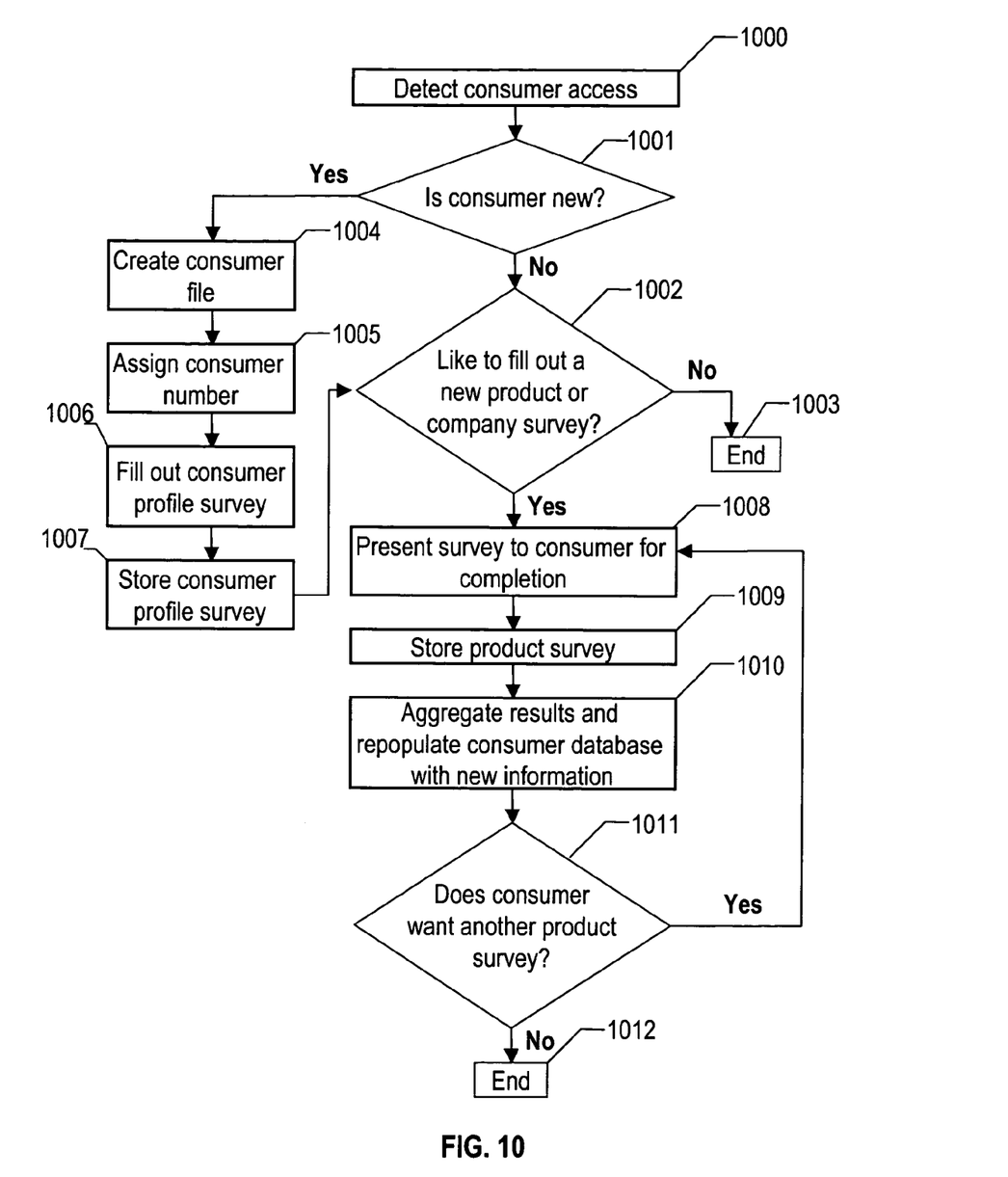
FIG. 10 is a flow diagram of the steps in the creation of a consumer profile in accordance with the present invention.

FIG. 10 is a flow diagram of the steps in the creation of a consumer profile or a product or company survey for a particular product in accordance with the present invention. In this process, step 1000 detects an attempt to access the consumer database 35. Step 1001 makes a determination of whether the accessor is a new consumer to the database. This determination can be in the form of conventional login procedure in which the consumer shows some form of identification. The identification process could be requesting the consumer to submit their consumer number. If the consumer is not new, the process moves to step 1002, which determines whether the consumer desires to complete a product or company survey. If the consumer does desire to complete a product or company survey, step 1002 requests the consumer to identify a product or company from the consumer database. If the consumer does not desire to complete a product or company survey, the process terminates in block 1003. Referring back to step 1001, if the user accessing the database is new and does not have a consumer number, the process moves to step 1004, which creates a new consumer file. The process then assigns the accessor a consumer number in step 1005. Next, the consumer completes the consumer profile survey in step 1006. Following the completion of the survey, this consumer profile survey is stored in the database in step 1007. At this point, the process would move to step 1002.

Referring again to step 1002, the consumer would identify a product from the consumer database for which the consumer desires to create a consumer profile. As part of this product identification step, there could be a list of the products in the database for which the consumer could create a profile. For example, the consumer may desire to create a profile for batteries. The consumer could select 'batteries' from a products list. In step 1008, the consumer would complete a survey similar to the one shown in FIG. 6 for the product 'batteries'. In this survey, the consumer would indicate preferences for each product or company attribute. When the consumer completes the survey, step 1009 stores this product survey in that consumer's file as shown in FIG. 7. After the completion and storing of the survey, step 1010 aggregates the results of the consumer survey and incorporates these results into the product summary or company for that completed survey. These results will be reflected in FIG. 7 or FIG. 9. At this point, step 1011 queries the consumer to determine if the consumer desires to complete another survey for a different product or company. If the consumer does desire to complete another product or company survey, the process will return to step 1008 and would repeat steps 1008, 1009, and 1010, for the new product or company. If the consumer does not desire to complete another survey, the process terminates in block 1012.

Figure 11:
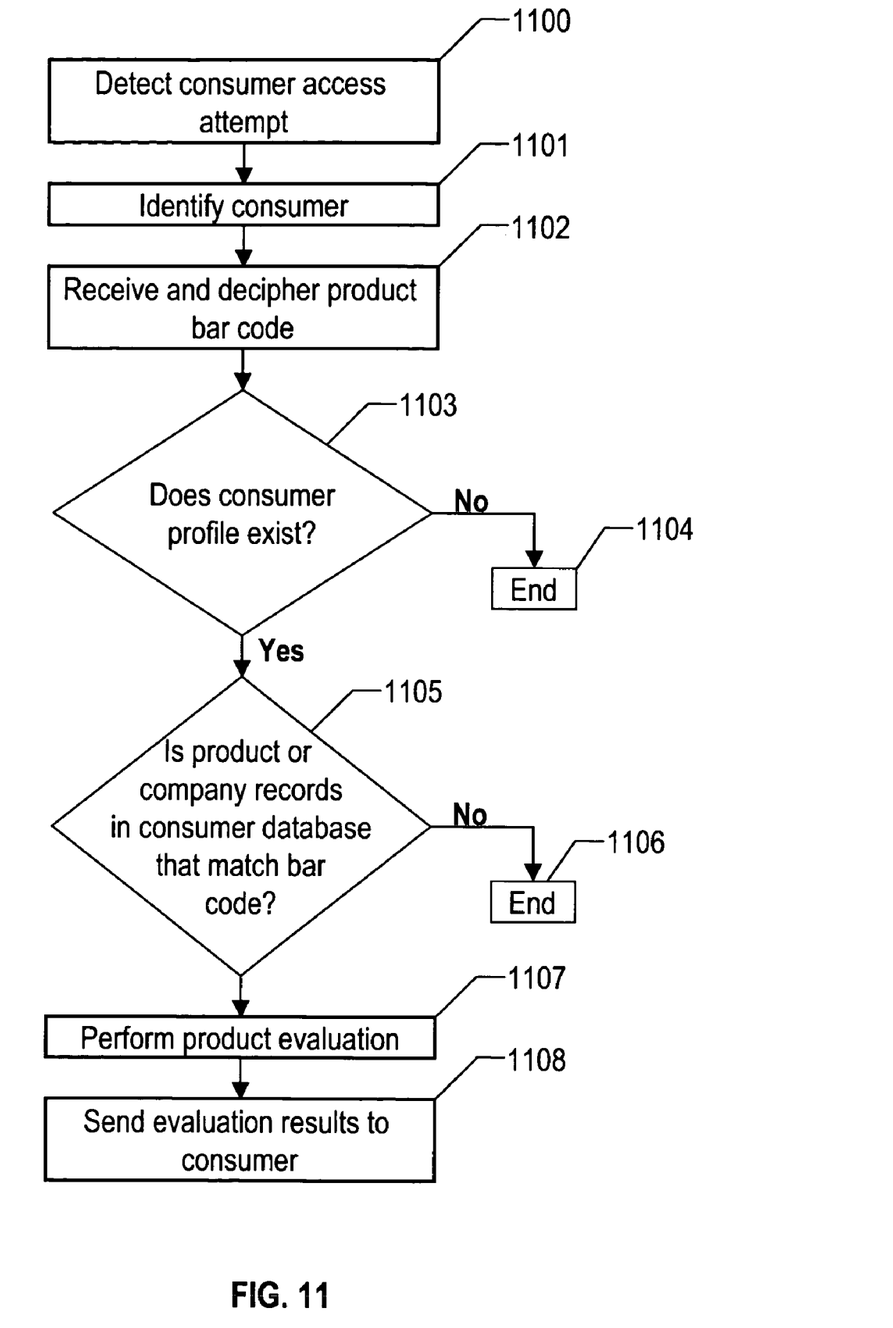
FIG. 11 is a flow diagram of the steps in the evaluation of a product in accordance with the present invention.

FIG. 11 is a flow diagram of the steps in the evaluation of a product in accordance with the present invention. Step 1100 detects an attempt to access the search products and services center 34 in FIG. 3. Step 1101 identifies the consumer attempting the access. This step could be simply requesting the consumer to submit their consumer number. Once the consumer access is established, the consumer can enter the product for which the consumer seeks an evaluation. The consumer can be in a stationary setting such as a home or in a mobile setting such as a store. In a stationary setting, there may several ways to identify the product. However, in a mobile setting, the consumer could use a handheld device, such as a PDA shown in FIG. 1, to scan the product bar code. The handheld device scans the device and sends this information via wireless communication across the communication network 32 to the products and services evaluation center.

Step 1102 receives and deciphers the product bar code. The bar code contains product information, which includes the type of product, the brand of the product and the price of the product. With the product type information, step 1103 can determine whether the consumer has a profile. If the consumer does not have a profile, the process terminates in step 1104. If in step 1103, the determination is that the consumer does have a profile, the process moves to step 1105 where there is a determination of whether there is a product summary or company summary for this product in the database that matches the bar code of the product. If there is not product or company summary that matches the product bar code, the process terminates in step 1106. Because the comparison step 1107 requires both consumer profile information and product or company summary information for that product, if one piece of information is not available, the process cannot perform step 1107. However, if both pieces of information are available, step 1107 performs a product comparison of the identified product.

The product evaluation step 1107 comprises a comparison of the product preferences in the consumer profile with objective information about the product brand stored in the product summary or company summary tables in the consumer database. The objective can be of the type that is routinely found in consumer reports about various products or in statistics that consumer groups gather. The consumer profile will have a survey as shown in Figure. The attributes in the survey will have a rating given to it by the consumer that reflects the importance the consumer places on that attribute when the consumer considers purchases. For example, the consumer profile may have ratings such as: Quality—4, Size—1, Availability—1, and Price—3. This survey would indicate that, the consumer values quality then price as the two most important attributes of a purchase decision. The size and availability are not important to the consumer. In the present invention, since quality is the most important attribute to the consumer, this attribute will be weighted such that it has the most influence on the overall product rating. The price attribute will be weighted more than the availability or size attributes, but less than the quality attribute. If two attributes have the same rating, both attributes would receive the same rating.

As mentioned, the product summary of FIG. 7 will have ratings for each brand of the product. Each product brand in the product summary will have ratings for the attributes that correspond to the attributes in the product survey. For example, the price rating for each product will be in comparison to the prices of the other brands of that product. In addition, the quality rating can be in comparison to the other brands. Again, these types of ratings are similar to the ratings that many consumer groups give these products. The same is done for each company stored in the company summary tables with the company survey questions.

The particular comparison routine can vary. However, one approach would be to generate a rating number from the product survey attributes that would reflect the consumer's preferences with regard to this product. Rating numbers from the product summary data for each product brand that would reflect an objective rating for that product brand based on the attributes in the consumer survey or general attributes in the product summary. During a profile survey, a consumer may not respond to each attribute in the survey. In this case, the attributes with no rating could be excluded from the comparison logic routines for that consumer. Each product would have a rating that would be compared to the consumer's profile survey. The product brand with the closest rating would be considered the best purchase choice for the consumer. The brand with the furthest rating would be the least likely purchase option for this consumer. The lights on the PDA device would indicate a favorable rating or an unfavorable rating. A different consumer would have a different consumer product survey rating and as a result would likely have a different result when performing the product comparisons.

Referring again to FIG. 11, at the completion of the evaluation, step 1108 sends a report/recommendation back to the consumer. After receipt of this information, the consumer can then make purchasing decisions with regard to that particular product. Referring to FIG. 11, steps 1103 through 1108 would be the same for a consumer accessing this method from a stationary location.

The present invention provides an attractive alternative to the manual forms of consumer research. This automated approach to consumer product research will provide more consumers with the information that they need to make more informed purchasing decisions. It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

Having thus described the invention, what we claims as new and desire to secure by Letters Patent is set forth in the following claims.

We claim:

1. A method for retrieval of specialized consumer information comprising the steps of:

creating a consumer database; creating a consumer profile for a consumer containing specific purchasing preferences of that consumer for a particular product;

receiving information about a particular product for which a consumer is considering purchasing, by detecting an attempt to access the consumer database, identifying the consumer attempting to access the consumer database; and determining the product for which the consumer is considering purchasing based on the received product information;

performing a product evaluation of the particular product for which a consumer is considering purchasing based on the consumer profile of that consumer for that product, said product evaluation performance comprising retrieving a product survey from the consumer's profile for the determined product, retrieving product summary information for the determined product, generating a product survey rating from the consumer profile, generating a product rating from the product summary, comparing the product survey rating and the product rating from the product summary and producing a product evaluation based on this comparison; and sending the product evaluation results for that particular product to the specific consumer requesting this information.

2. The method as described in claim 1 wherein said database creation step further comprises the steps of:
creating a consumer file for a consumer;
assigning a consumer number to the consumer;
identifying a product for which the consumer desires to create a product survey;
performing a product survey to the consumer for completion; and
storing the data contained in a completed product survey of the consumer for the identified product in the consumer file for the particular consumer.

3. The method as described in claim 2 further comprising after said storing step, the step of determining whether the consumer desires to create another product survey for a different product and repeating said identifying, performing and storing steps when the determination is that the consumer desires to create another consumer profile.

4. The method as described in claim 3 wherein said consumer file creating step, the steps of:
detecting an attempt to access the consumer database; and
determining whether the consumer attempting to access the database is a new consumer.

5. The method as described in claim 1 further comprising the step of determining whether there is a consumer profile for the determined product.

6. The method as described in claim 5 further comprising the step of determining whether there is a product summary for the determined product.

7. The method as described in claim 1 wherein attributes of the product survey and product summary are weighted based on the specific preferences of the particular consumer.

8. A computer program product in a computer readable medium for retrieval of specialized consumer information comprising:
instructions creating a consumer database;
instructions creating a consumer profile for a consumer containing specific purchasing preferences of that consumer for a particular product;
instructions receiving information about a particular product for which a consumer is considering purchasing, said receiving instructions further comprising instructions for detecting an attempt to access the consumer database, instructions for identifying the consumer attempting to access the consumer database, and instructions for determining the product for which the consumer is considering purchasing based on the received product information;
instructions performing a product evaluation of the particular product for which a consumer is considering purchasing based on the consumer profile of that consumer for that product, said product evaluation performance instructions further comprise instructions retrieving a product survey from the consumer's profile for the determined product, instructions retrieving product summary information for the determined product, instructions generating a product survey rating from the consumer profile, instructions generating a Product rating from the product summary and instructions comparing the product survey rating and the product rating from the product summary and producing a product evaluation based on this comparison; and
instructions sending the product evaluation results to the consumer for that particular product.

9. The computer program product as described in claim 8 wherein said database creation instructions further comprise:
instructions creating a consumer file for a consumer;
instructions assigning a consumer number to the consumer;
instructions identifying a product for which the consumer desires to create a product survey;
instructions performing a product survey to the consumer for completion; and
instructions storing the data contained in a completed product survey of the consumer for the identified product in the consumer file for the particular consumer.

10. The computer program product as described in claim 9 further comprising after said storing instructions, instructions for determining whether the consumer desires to create another product survey for a different product and repeating said identifying, performing and storing instructions when the determination is that the consumer desires to create another consumer profile.

11. The computer program product as described in claim 10 wherein said consumer file creating instructions further comprise:
instructions detecting an attempt to access the consumer database; and
instructions determining whether the consumer attempting to access the database is a new consumer.

12. The computer program product as described in claim 8 further comprising instructions determining whether there is a consumer profile for the determined product.

13. The computer program product as described in claim 12 further comprising instructions determining whether there is a product summary for the determined product.

14. The computer program product as described in claim 8 further comprising instructions weighting attributes of the product survey and product summary based on the specific preferences of the particular consumer.

15. A system for retrieval of specialized consumer information comprising:
a memory storing a consumer, product profile containing specific information about the purchasing preferences of the consumer;
a products database stored in a computer readable medium containing objective information about a plurality of different products;
a processor coupled to the memory and products database executing:
a software routine receiving information about a particular product for which a consumer is considering purchasing, by detecting an attempt to access the consumer database, identifying the consumer attempting to access the consumer database; and determining the product for which the consumer is considering purchasing based on the received product information; and a software routine performing a comparison of between the profile of the consumer and a specific product in the products database and generating a purchasing recommendation with regard to the purchase of the product that is the subject of the comparison; wherein the performing a comparison function includes retrieving a product survey from the consumers product profile for the determined product, retrieving product summary information for the determined product, generating a product survey rating from the consumer product profile, generating a product rating from the product summary and comparing the product survey rating and the product rating from the product summary and producing a product recommendation based on this comparison; and a device operated by a consumer, said device communicating with said software routine performing the comparison and receiving the purchase recommendation.

16. The system as described in claim 15 wherein said consumer product profile further comprises a set of purchasing attributes that the consumer will consider when making a decision to purchase a product, said profile contains a set of purchasing attributes for each product contained in the consumer profile.

17. The system as described in claim 16 wherein said products database further comprises a set of product summaries for a plurality of products and brands within a particular product, each product summary containing a set of rated attributes.

18. The system as described in claim 17 wherein said consumer product profile and said database each resides on a separated web page.

19. The system as described in claim 17 wherein said consumer product profile, said database, and said software routine all reside in a central location.

* * * * *